United States Patent [19]

Kawamura et al.

[11] Patent Number: 4,508,805
[45] Date of Patent: Apr. 2, 1985

[54] DISAZO COMPOUNDS, PHOTOCONDUCTIVE COMPOSITIONS AND ELECTROPHOTOGRAPHIC LIGHT-SENSITIVE MATERIALS CONTAINING THE SAME

[75] Inventors: Kouichi Kawamura; Seiji Horie; Naonori Makino; Hideo Sato, all of Kanagawa, Japan

[73] Assignee: Fuji Photo Film Co., Ltd., Kanagawa, Japan

[21] Appl. No.: 523,920

[22] Filed: Aug. 16, 1983

[30] Foreign Application Priority Data

Aug. 16, 1982 [JP] Japan .................. 57-141821

[51] Int. Cl.³ ............................................. G03G 5/06
[52] U.S. Cl. ........................................ 430/72; 430/73; 430/76; 430/58
[58] Field of Search ............. 260/160; 430/72, 73, 430/76

[56] References Cited

U.S. PATENT DOCUMENTS 3,873,312 3/1975 Contois ................................. 430/73
4,242,260 12/1980 Sasaki et al. ......................... 430/73

Primary Examiner—John E. Kittle
Assistant Examiner—John L. Goodrow
Attorney, Agent, or Firm—Sughrue, Mion, Zinn, Macpeak and Seas

[57] ABSTRACT

Disazo compounds as well as the compositions and electrophotographic light-sensitive materials utilizing them are disclosed. The disazo compounds are represented by the general formula (I):

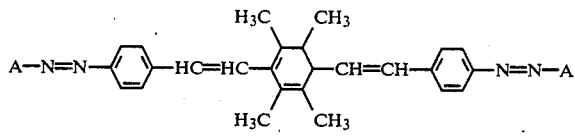

wherein the substituents within general formula (I) are defined within the specification. By utilizing the specifically disclosed disazo compounds the electrophotographic light-sensitive material has high sensitivity and high durability.

9 Claims, 1 Drawing Figure

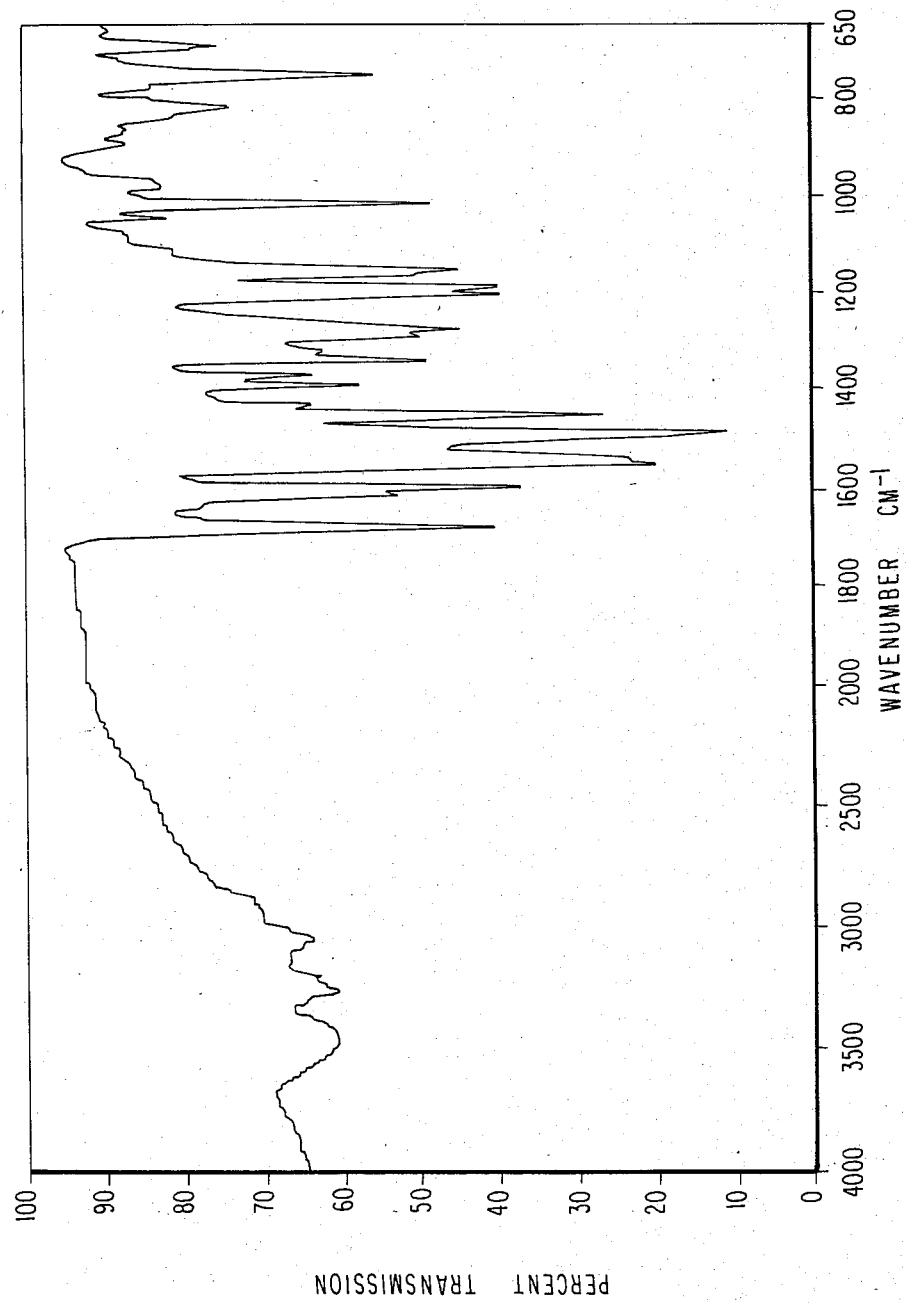

DISAZO COMPOUNDS, PHOTOCONDUCTIVE COMPOSITIONS AND ELECTROPHOTOGRAPHIC LIGHT-SENSITIVE MATERIALS CONTAINING THE SAME

FIELD OF THE INVENTION

The present invention relates to novel disazo compounds, photoconductive compositions containing these disazo compounds, and electrophotographic light-sensitive materials comprising an electrophotographic light-sensitive layer containing these disazo compounds.

BACKGROUND OF THE INVENTION

A photoconductive process for the electrophotographic light-sensitive materials consists of (1) a step of generating electric charges by exposing to light, and (2) a step of transporting the electric charges.

Steps (1) and (2) can be carried out in the same substance with a material such as a selenium light-sensitive plate. However, steps (1) and (2) may be carried out in different substances by using a combination such as amorphous selenium and poly-N-vinylcarbazole. When steps (1) and (2) are carried out in different substances, it is advantageous in that the substances used in the electrophotographic light-sensitive materials can be selected from a wide range of materials. Consequently, the electrophotographic characteristics of the electrophotographic light-sensitive materials, such as sensitivity or acceptable electric potential, etc. are improved. Further, substances suitable for producing the electrophotographic light-sensitive coating layer can be selected from a wide range.

Photoconductive substances in the electrophotographic light-sensitive materials used for the electrophotographic process include selenium, cadmium sulfide and zinc oxide.

In the electrophotographic process, as disclosed in U.S. Pat. No. 2,297,691 by Carlson, the photoconductive material used is comprised of a base coated with a substance which is insulating in the dark, the electric resistance of which varies according to an exposure applied during imagewise exposing to light. This photoconductive material is generally charged first to give uniform surface electric charges in the dark after having carried out dark adaptation for a suitable time. This material is then imagewise exposed to light by a light pattern which has the effect of reducing surface electric charges according to relative energy included in various parts of the light pattern. The residual surface electric charges or latent images formed on the surface of the photoconductive material layer (electrophotographic light-sensitive layer) are brought into contact with a suitable electroscopic indication material, namely, a toner to obtain visible images.

The toner is contained in an insulating solution or a dry carrier. The toner will adhere to the surface of the electrophotographic light-sensitive layer according to the electric charge pattern. The adhered indication material can be fixed by a known means such as heat, pressure or solvent vapor. Further, the latent images can be transferred to a second base (for example, paper or film, etc.). Likewise, the latent images can be transferred to the second base where they are developed. The electrophotographic process is one of such image forming processes.

In such an electrophotographic process, the basic characteristics required for the electrophotographic light-sensitive materials are: (1) the electrophotographic light-sensitive material can be charged in a suitable electric potential in the dark; (2) there is a low level of leakage of electric charges in the dark; and (3) electric charges can be quickly discharged by light irradiation.

It is true that the above described inorganic substances used hitherto have many advantages. However, they also have various disadvantages. For example, selenium widely used at the present sufficiently satisfies the above described requirements (1) to (3). However, it is undesirable because production thereof requires maintaining difficult conditions which increase the production cost. It is difficult to make a long sheet because of the lack of flexibility, and it is necessary to carefully handle the material because it is sensitive to thermal and mechanical impacts. Cadmium sulfide and zinc oxide are used as electrophotographic light-sensitive materials by dispersing them in a resin binder. However, they can not be repeatedly used, because they have mechanical disadvantages such as smoothness, hardness, tensile strength and friction resistance.

In the recent years, in order to remove the disadvantages of these inorganic substances, electrophotographic light-sensitive materials using various organic substances have been proposed and some of them have been put in practical use. For example, there is an electrophotographic light-sensitive material composed of poly-N-vinylcarbazole and 2,4,7-trinitrofluorenon-9-one (U.S. Pat. No. 3,484,237), an electrophotographic light-sensitive material in which poly-N-vinylcarbazole is sensitized with pyrylium salt type dyes (U.S. Pat. No. 3,617,268), an electrophotographic light-sensitive material containing an organic pigment as a main component (U.S. Pat. No. 3,898,084) and an electrophotographic light-sensitive material containing an eutectoid complex composed of a dye and a resin as the main component (U.S. Pat. No. 3,732,180 and 3,684,502), etc.

In these organic electrophotographic light-sensitive materials, though mechanical characteristics and flexibility of the above described inorganic electrophotographic light-sensitive material can be improved to a certain extent, they do not sufficiently satisfy the requirements of electrophotographic light-sensitive materials because they generally have a low light-sensitivity and are not suitable for repeated use.

SUMMARY OF THE INVENTION

As a result of earnest studies to eliminate the disadvantages of the above described prior electrophotographic light-sensitive materials, the present inventors have found that electrophotographic light-sensitive materials containing novel disazo compounds have high sensitivity and high durability sufficient for practical use.

The present invention relates to novel disazo compounds (disazo pigments) represented by the following general formula (I), photoconductive compositions containing the same, and electrophotographic light-sensitive materials having an electrophotographic light-sensitive layer containing the same.

Namely, the present invention relates to:

(1) Disazo compounds represented by the following general formula (I):

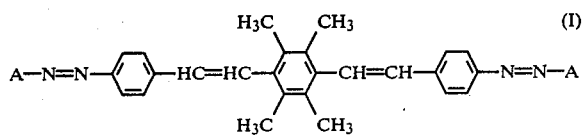

wherein A represents

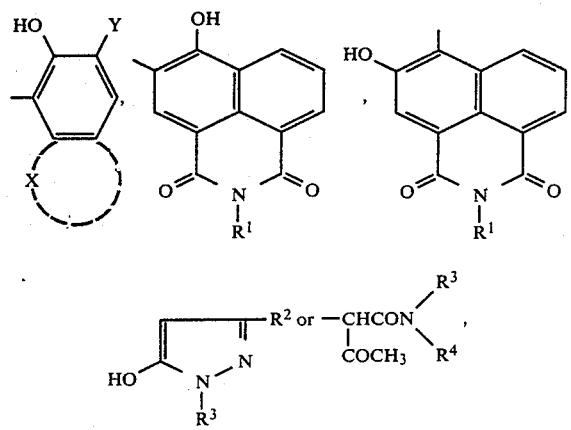

wherein X represents a group necessary to form an aromatic ring such as a naphthalene ring or an anthracene ring or a heterocyclic ring such as an indole ring, a carbazole ring, a benzocarbazole ring or a dibenzofuran ring (which may be substituted or nonsubstituted) by condensing with the benzene ring in the above described formula to which a hydroxyl group and Y are attached, Y represents

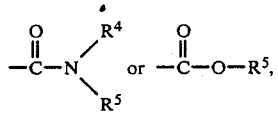

$R^1$ represents an alkyl group, a phenyl group or a substituted alkyl or phenyl group, $R^2$ represents a hydrogen atom, a lower alkyl group, a carbamoyl group, a carboxyl group, an alkoxycarbonyl group, an aryloxycarbonyl group, or a substituted or nonsubstituted amino group, $R^3$ and $R^5$ each represents an alkyl group, an aromatic group such as a phenyl group, a naphthyl group or an anthryl group, etc., a heteroaromatic group such as a dibenzofuranyl group, a carbazolyl group, a benzocarbazolyl group or an indolyl group, etc., or a substituted group of the alkyl, aromatic or heteroaromatic group, and $R^4$ represents a hydrogen atom, an alkyl group, a phenyl group or a substituted alkyl or phenyl group;

(2) photoconductive compositions containing disazo compounds represented by the above described general formula (I); and (3) electrophotographic light-sensitive materials having an electrophotographic light-sensitive layer containing disazo compounds represented by the above described general formual (I).

BRIEF DESCRIPTION OF THE DRAWING

The FIGURE is an infrared ray absorption spectrum (KBr method) of the disazo compound (1) of the present invention.

DETAILED DESCRIPTION OF THE INVENTION

Disazo compounds represented by the general formula (I) are described below in greater detail.

X is a group capable of forming an aromatic ring such as a naphthalene ring or an anthracene ring, etc. or a heterocyclic ring such as an indole ring, a carbazole ring, a benzocarbazole ring or a dibenzofuran ring, etc. by condensing with the benzene ring to which the hydroxyl group and Y are attached.

When X is an aromatic ring or heterocyclic ring having substituents, examples of substituents are halogen atoms (for example, fluorine atom, chlorine atom and bromine atom, etc.), lower alkyl groups and, preferably, lower alkyl groups having 1 to 8 carbon atoms (for example, methyl group, ethyl group, propyl group, butyl group, isopropyl group and isobutyl group, etc.). The number of substituents is 1 or 2. In case of two substituents, they may be identical or different from each other.

$R^1$ may be an alkyl group, preferably having 1 to 12 carbon atoms or a phenyl group.

When $R^1$ is a nonsubstituted alkyl group, examples of $R^1$ include methyl group, ethyl group, propyl group, butyl group, pentyl group, hexyl group, isopropyl group, isobutyl group, isoamyl group, isohexyl group, neopentyl group and tert-butyl group, etc.

When $R^1$ is a substituted alkyl group, examples of substituents include hydroxyl group, alkoxy groups having 1 to 12 carbon atoms, cyano group, amino group, alkylamino groups having 1 to 12 carbon atoms, dialkylamino groups having two alkyl groups having 1 to 12 carbon atoms, halogen atoms and aryl groups having 6 to 15 carbon atoms. Examples of the substituted alkyl group include hydroxyalkyl groups (for example, hydroxymethyl group, 2-hydroxyethyl group, 3-hydroxypropyl group and 2-hydroxypropyl group, etc.), alkoxyalkyl groups (for example, methoxymethyl group, 2-methoxyethyl group, 3-methoxypropyl group, ethoxymethyl group and 2-ethoxyethyl group, etc.), cyanoalkyl groups (for example, cyanomethyl group and 2-cyanoethyl group, etc.), aminoalkyl groups (for example, aminomethyl group, 2-aminoethyl group and 3-aminopropyl group, etc.), (alkylamino)alkyl groups (for example, (methylamino)methyl group, 2-(methylamino)ethyl group and (ethylamino)methyl group, etc.), (dialkylamino)alkyl groups (for example, (dimethylamino)methyl group and 2-(dimethylamino)ethyl group, etc.), halogenoalkyl groups (for example, fluoromethyl group, chlormethyl group and bromomethyl group, etc.) and aralkyl groups (for example, benzyl group and phenetyl group, etc.).

When $R^1$ is a substituted phenyl group, examples of substituents include hydroxyl group, alkoxy groups having 1 to 12 carbon atoms, cyano group, amino group, alkylamino groups having 1 to 12 carbon atoms, dialkylamino groups having two alkyl groups having 1 to 12 carbon atoms, halogen atoms, alkyl groups having 1 to 6 carbon atoms and nitro group. Examples of the substituted phenyl group include hydroxyphenyl groups, alkoxyphenyl groups (for example, methoxyphenyl group and ethoxyphenyl group, etc.), cyanophenyl groups, aminophenyl groups, (alkylamino)phenyl groups (for example, (methylamino)phenyl group and (ethylamino)phenyl group, etc.), (dialkylamino)phenyl groups (for example, (dimethylamino)phenyl group, etc.), halogenophenyl groups (for example, fluorophenyl group, chlorophenyl group and bromophenyl group, etc.), alkylphenyl groups (for example, tolyl group, ethylphenyl group, cumenyl group, xylyl group and mesityl group, etc.), nitrophenyl groups and groups having two or three of the above described substituents (which may be identical or different from one another) (position of the substituents and relation of the position between each of them are arbitrary).

More preferable substituted or nonsubstituted alkyl group for $R^1$ includes a methyl group, an ethyl group, a propyl group, an isopropyl group, a 2-hydroxyethyl group, a 2-cyanoethyl group, a methoxymethyl group, a 2-methylamino group, a 2-dimethylaminoethyl group, and a benzyl group.

More preferable substituted or nonsubstituted phenyl group for $R^1$ includes a phenyl group, a p-methoxy phenyl group, an ethylaminophenyl group, a dimethylaminophenyl group, a chlorophenyl group, a o-tolyl group and a p-nitrophenyl group.

It is preferred that $R^2$ is a hydrogen atom, a lower alkyl group having 1 to 6 carbon atoms, a carbamoyl group, a carboxyl group, an alkoxycarbonyl group having an alkoxy group having 1 to 12 carbon atoms, an aryloxycarbonyl group having an aryloxy group having 6 to 20 carbon atoms, or a substituted or nonsubstituted amino group.

When $R^2$ is a substituted amino group, examples thereof include methylamino group, ethylamino group, propylamino group, phenylamino group, tolylamino group, benzylamino group, phenetylamino group, dimethylamino group, diethylamino group and diphenylamino group, etc.

When $R^2$ is a lower alkyl groups, examples thereof include methyl group, ethyl group, propyl group, butyl group, isopropyl group and isobutyl group, etc.

When $R^2$ is an alkoxycarbonyl group, examples thereof include methoxycarbonyl group, ethoxycarbonyl group, propoxycarbonyl group, butoxycarbonyl group, isopropoxycarbonyl group and benzyloxycarbonyl group, etc.

When $R^2$ is an aryloxycarbonyl group, examples thereof include phenoxycarbonyl group and tolyloxycarbonyl group, etc.

It is preferred that $R^3$ and $R^5$ each is an alkyl group having 1 to 20 carbons, an aromatic group such as a phenyl group or a naphthyl group, etc., a heteroaromatic group containing an oxygen atom, a nitrogen atom or a sulfur atom, etc. such as a dibenzofuranyl group, a carbazolyl group or a benzocarbazolyl group, etc., or a substituted group of them.

When $R^3$ and $R^5$ are each a substituted or nonsubstituted alkyl group, examples thereof include the same groups as the above described substituted or nonsubstituted alkyl groups in $R^1$.

When $R^3$ and $R^5$ are each a substituted aromatic group such as a substituted phenyl group or a substituted naphthyl group, etc. or a substituted heteroaromatic group containing hetero atoms such as a substituted dibenzofuranyl group or a substituted carbazolyl group, examples of substituents include hydroxyl group, cyano group, nitro group, halogen atoms (for example, fluorine atom, chlorine atom, bromine atom and iodine atom), alkyl groups having 1 to 12 carbon atoms (for example, methyl group, ethyl group, propyl group and isopropyl group, etc.), alkoxy groups having 1 to 12 carbon atoms (for example, methoxy group, ethoxy group, propoxy group, butoxy group, pentyloxy group, isopropoxy group, isobutoxy group, isoamyloxy group, tert-butoxy group and neopentyloxy group, etc.), amino group, alkylamino groups having 1 to 12 carbon atoms (for example, methylamino group, ethylamino group and propylamino group, etc.), dialkylamino groups having 1 to 12 carbon atoms (for example, dimethylamino group, diethylamino group and N-methyl-N-ethylamino group, etc.), arylamino groups having 6 to 12 carbon atoms (for example, phenylamino group and tolylamino group, etc.), diarylamino groups having two aryl groups having 6 to 15 carbon atoms (for example, diphenylamino group, etc.), carboxyl group, alkali metal carboxylate groups (examples of alkali metal (cation): $Na^+$, $K^+$ and $Li^+$, etc.), alkali metal sulfonate groups (examples of alkali metal (cation): $Na^+$, $K^+$ and $Li^+$, etc.), alkylcarbonyl groups (for example, acetyl group, propionyl group and benzylcarbonyl group, etc.), arylcarbonyl groups having an aryl group having 6 to 12 carbon atoms (for example, benzoyl group, toluoyl group and furoyl group, etc.), alkylthio groups having 1 to 12 carbon atoms (for example, methylthio group and ethylthio group, etc.), and arylthio groups having 1 to 12 carbon atoms (for example, phenylthio group and tolythio group, etc.). The number of thhe substituents is 1 to 3. In case of having a plurality of substituents, they may be identical or different from one another and have a suitable combination. Further, the position of the substituents is arbitrary.

$R^4$ may be a hydrogen atom, an alkyl group having 1 to 20 carbon atoms, a phenyl group or a substituted group thereof.

When $R^4$ is a substituted or nonsubstituted alkyl or phenyl group, examples thereof include the same groups as those of the above described substituted or nonsubstituted alkyl or phenyl group in $R^3$ and $R^5$.

As A which is derived from couplers,

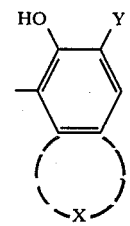

is preferred, because a photoconductive composition or electrophotographic light-sensitive layer having a high light-sensitivity is obtained and the disazo compounds can be produced at a low cost because the raw materials can be easily available.

Further, as X, a group forming a naphthalene ring, a carbazole ring or a dibenzofuran ring is preferred.

As Y,

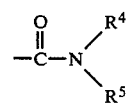

is preferred.

In the following, examples of the compounds of the present invention are described.

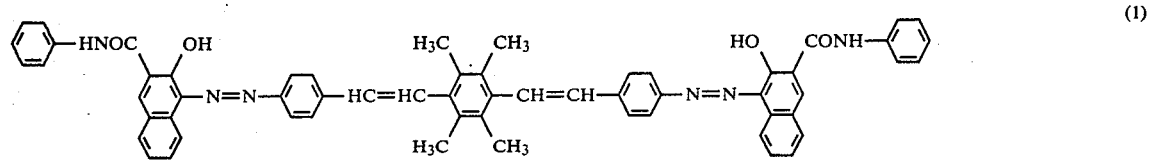
(1)
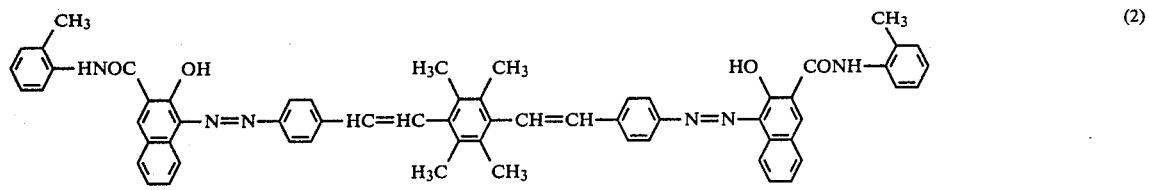
(2)
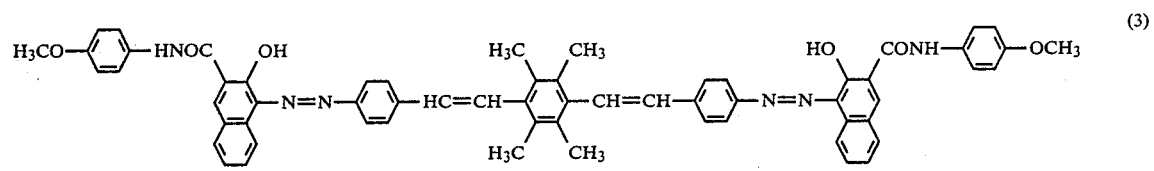
(3)
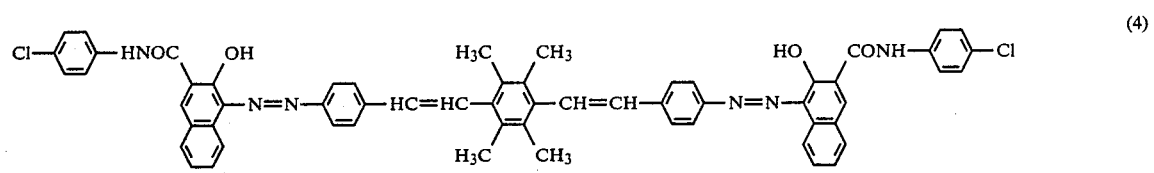
(4)
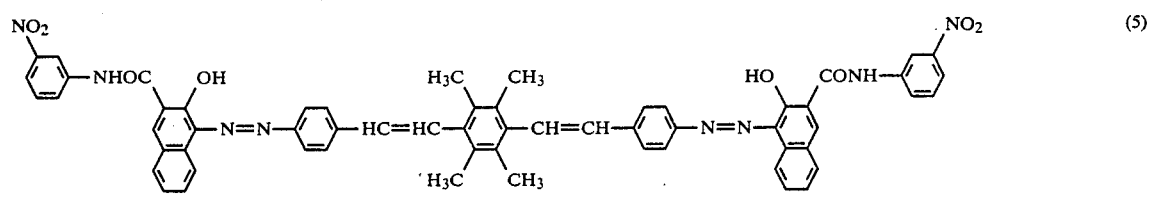
(5)
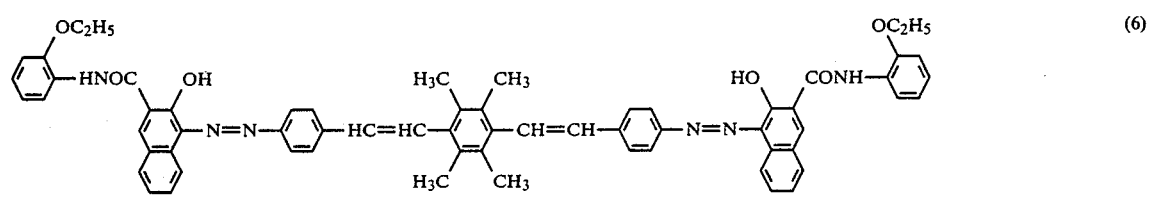
(6)
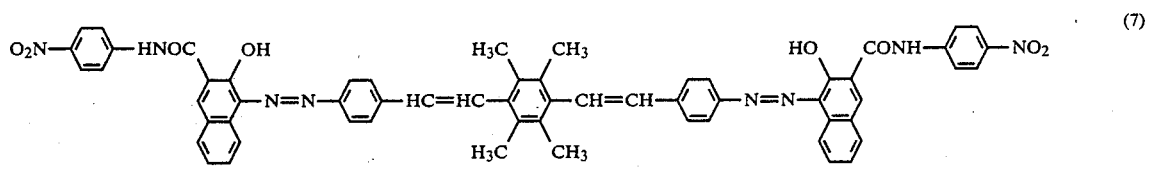
(7)
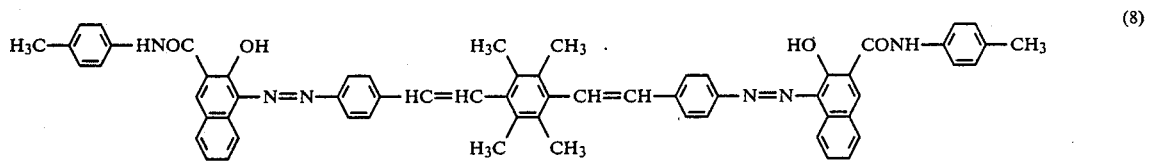
(8)
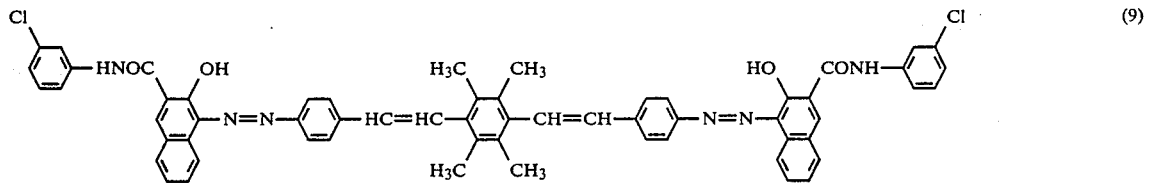
(9)

-continued
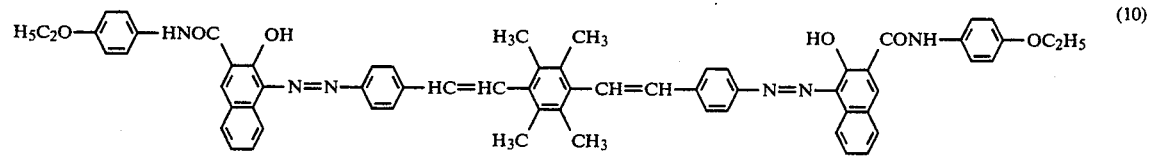
(10)
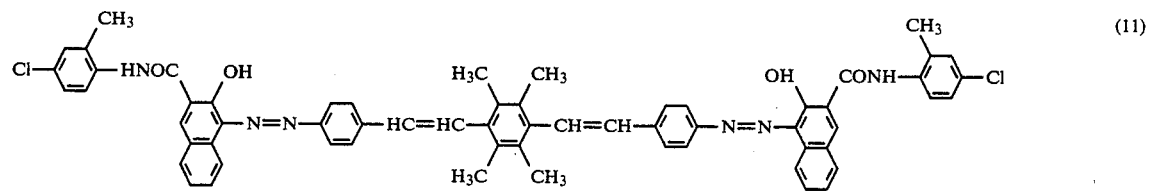
(11)
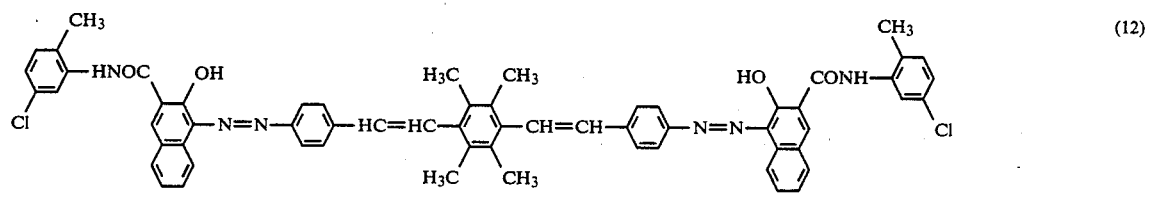
(12)
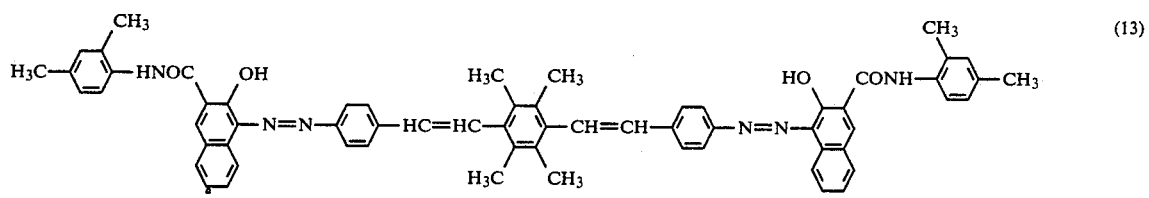
(13)
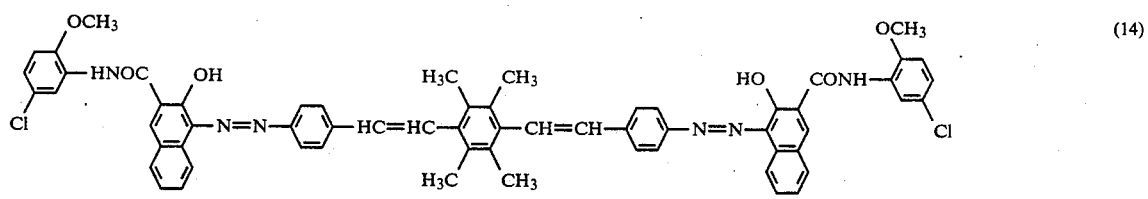
(14)
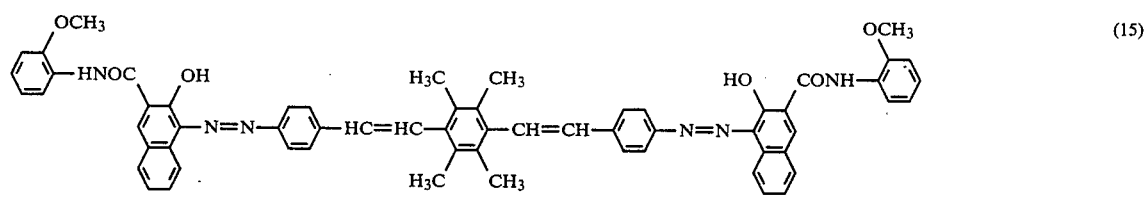
(15)
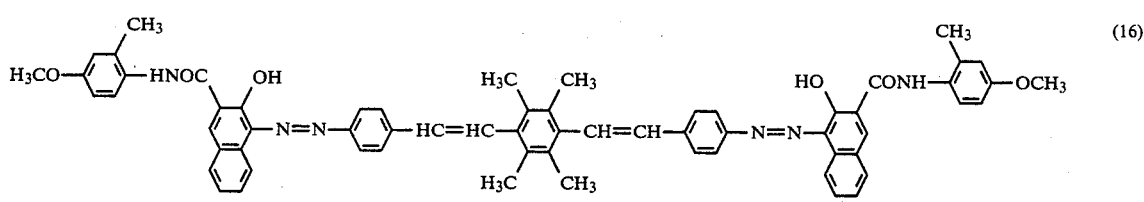
(16)
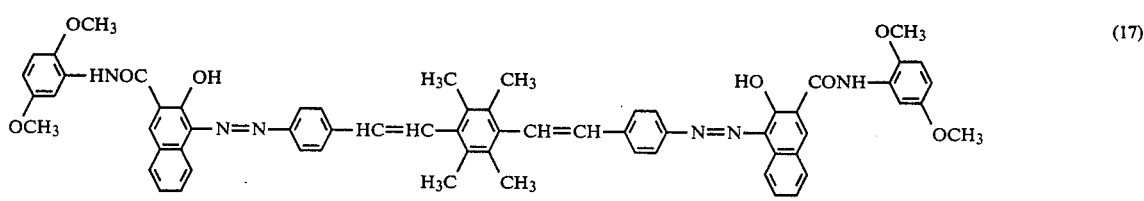
(17)

-continued
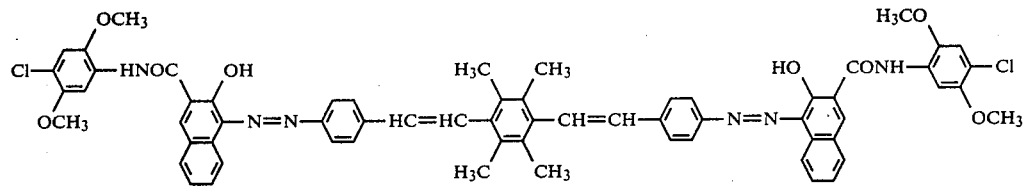
(18)
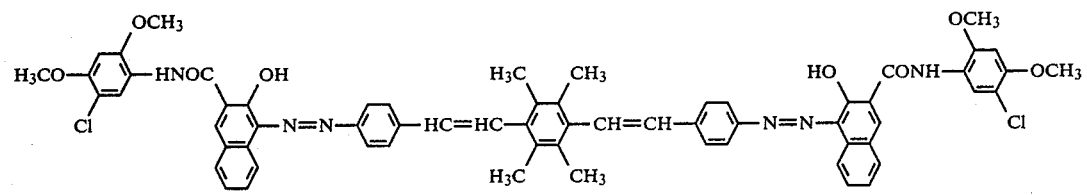
(19)
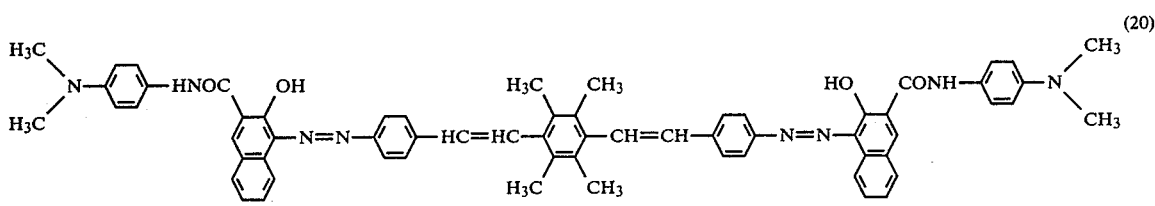
(20)
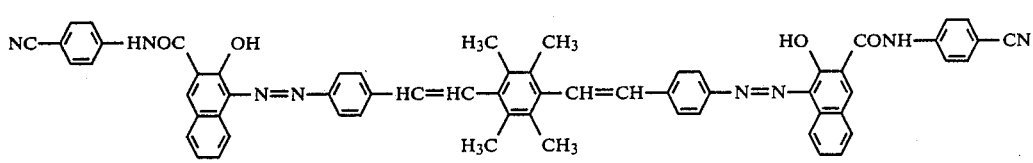
(21)
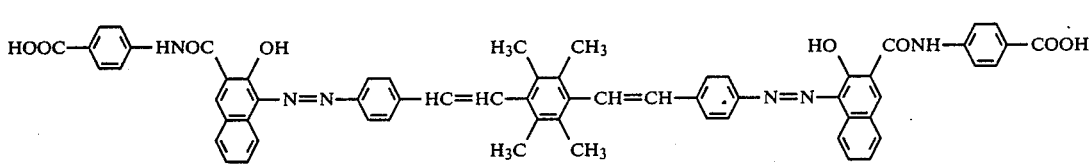
(22)
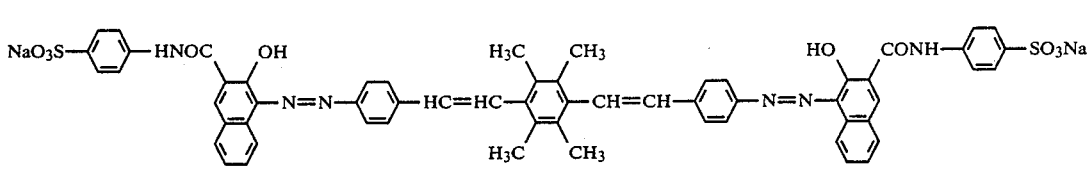
(23)
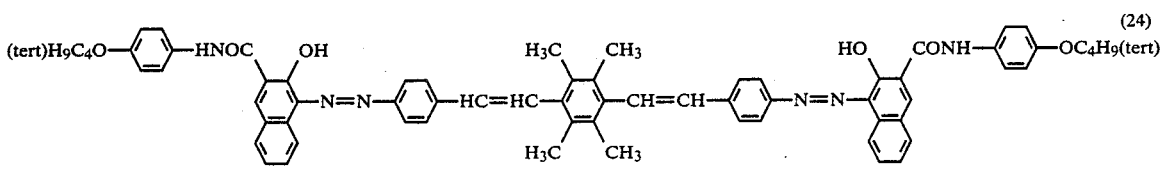
(24)
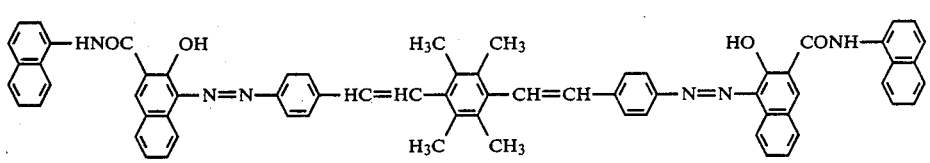
(25)
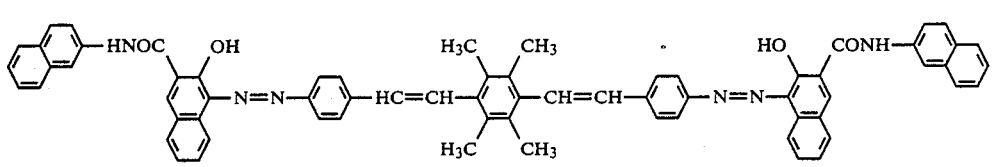
(26)

-continued
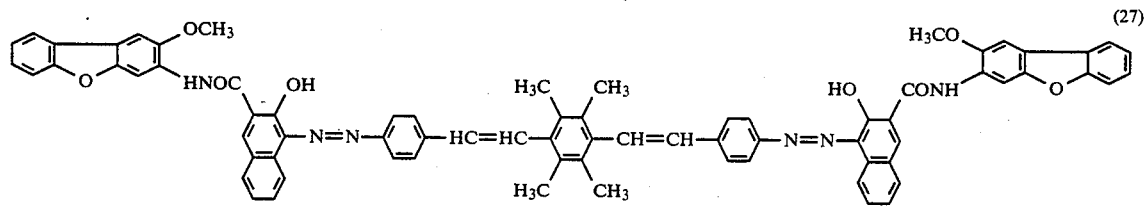
(27)
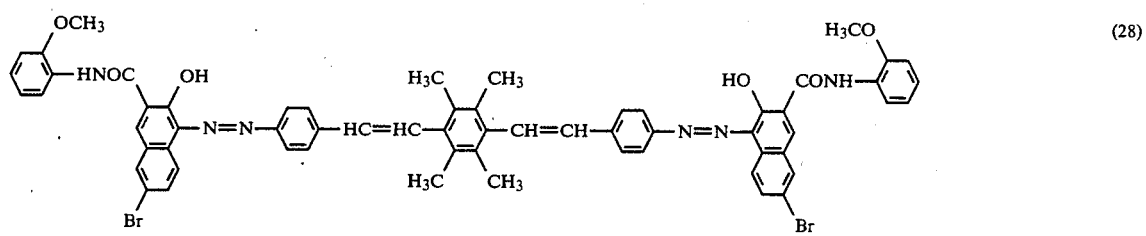
(28)
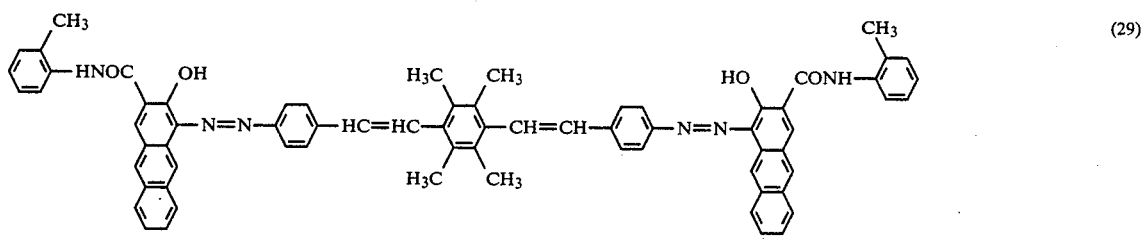
(29)
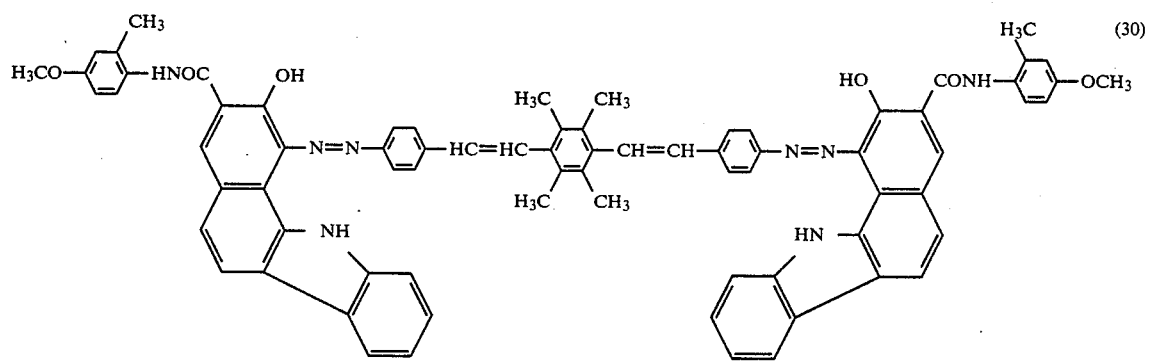
(30)
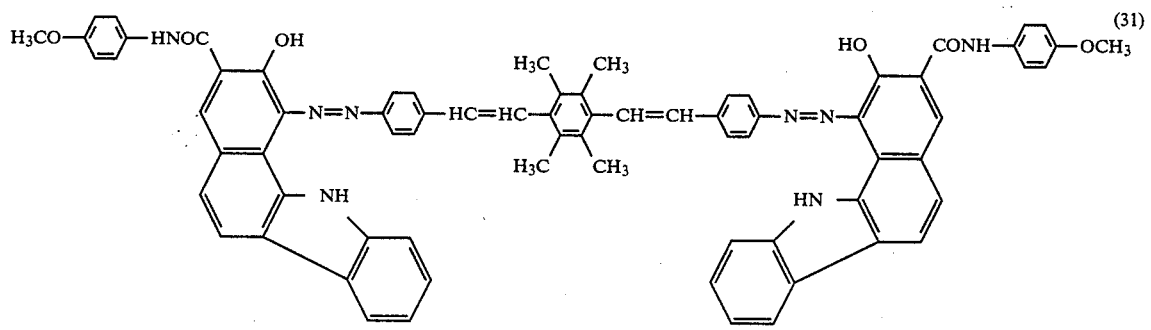
(31)

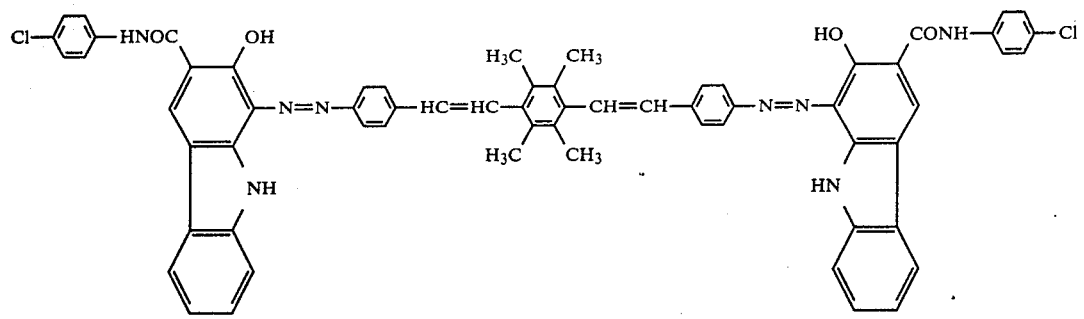
(32)
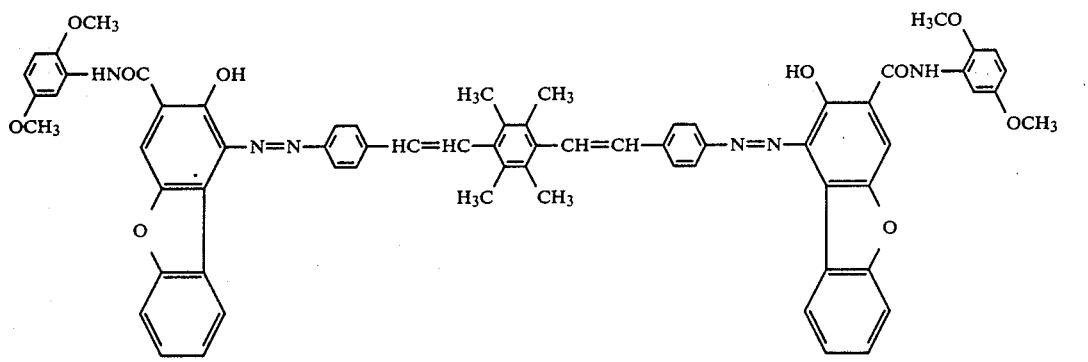
(33)
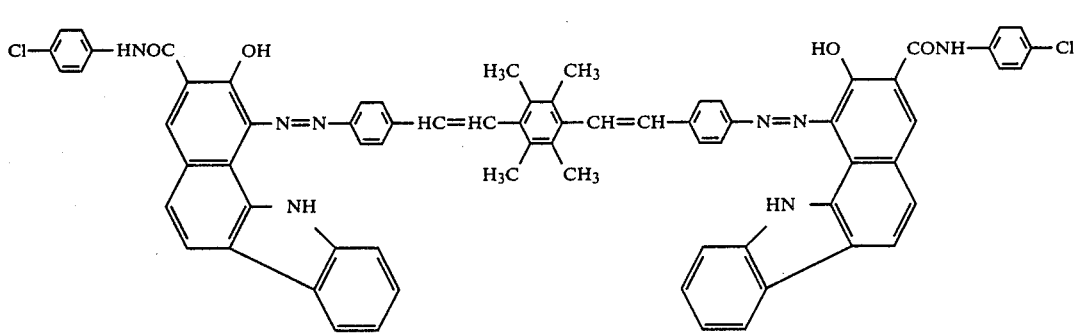
(34)
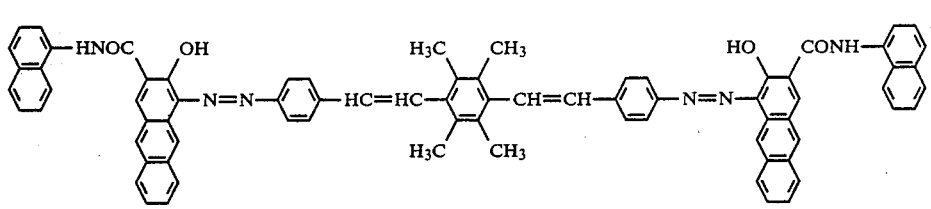
(35)
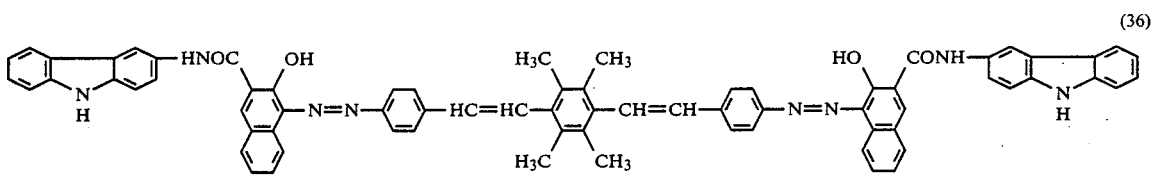
(36)
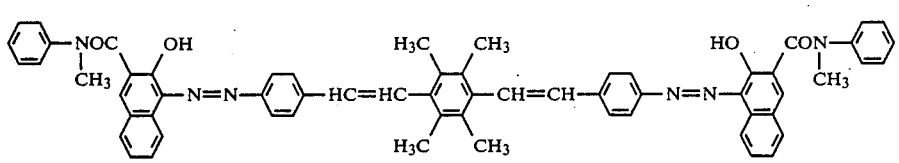
(37)

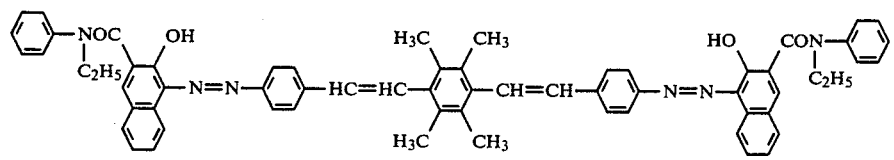
(38)
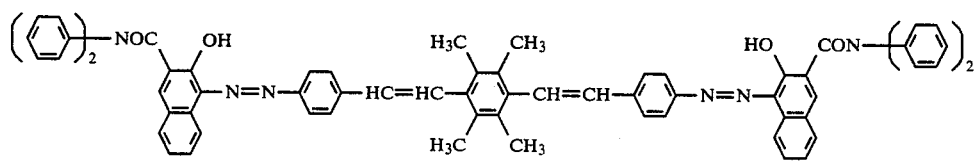
(39)
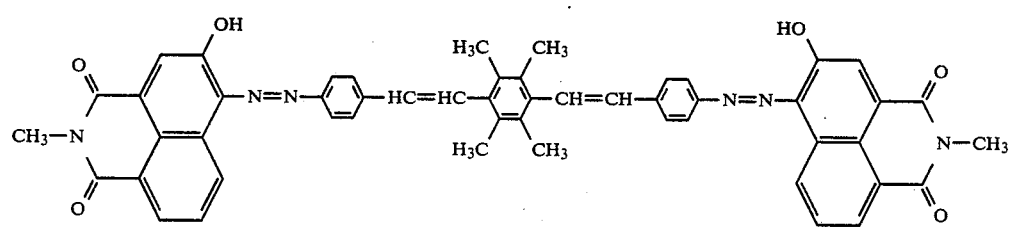
(40)
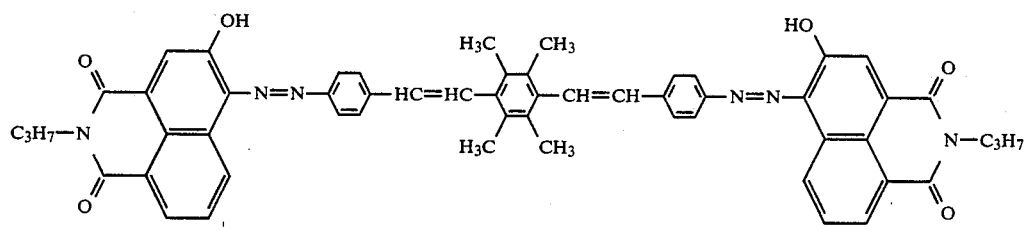
(41)
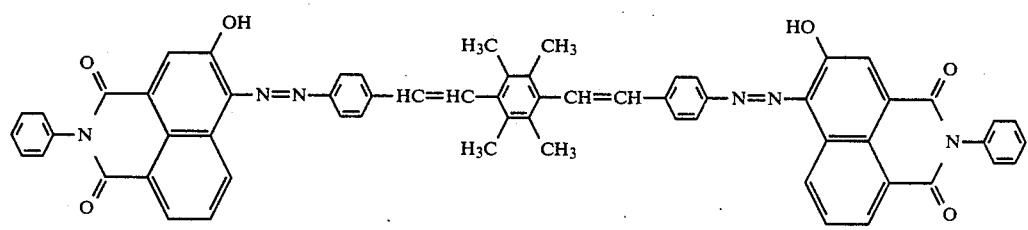
(42)
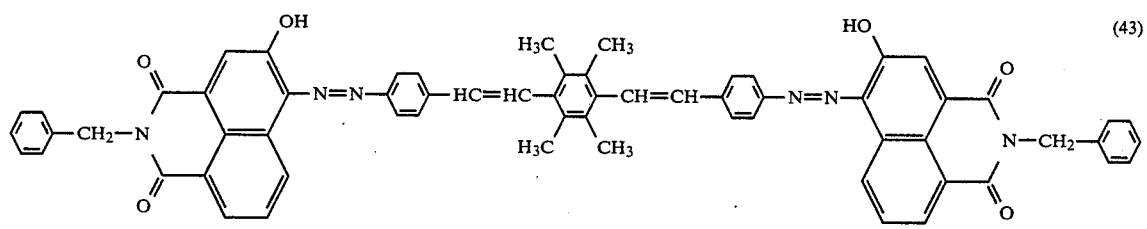
(43)
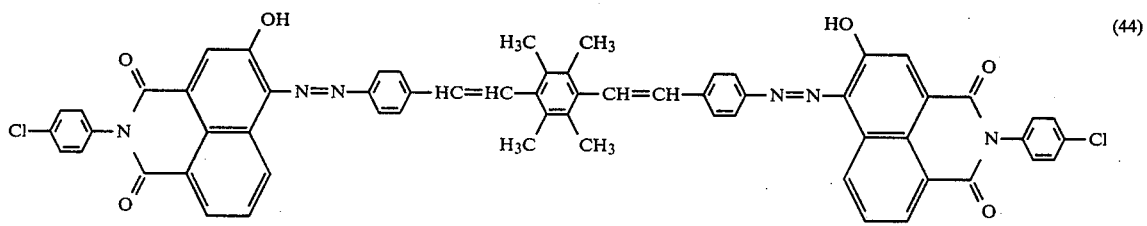
(44)

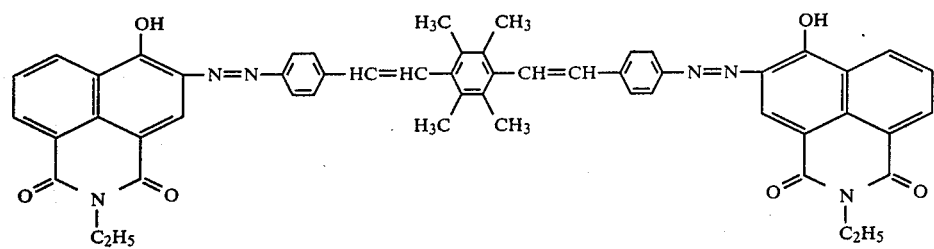
(45)
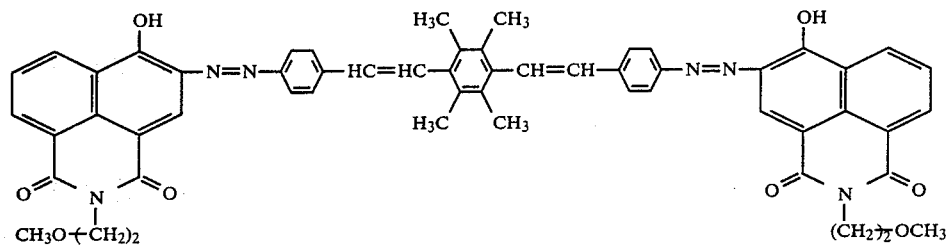
(46)
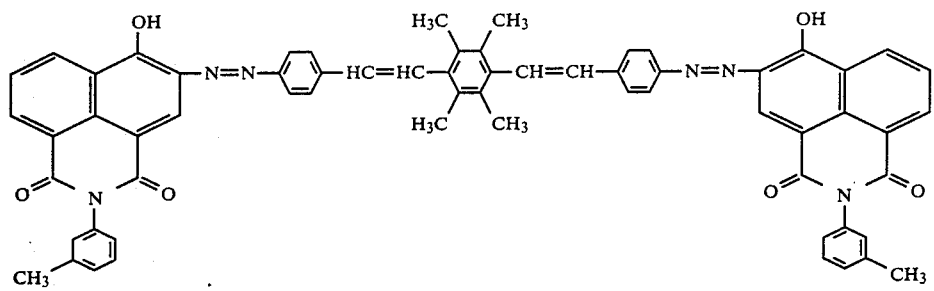
(47)
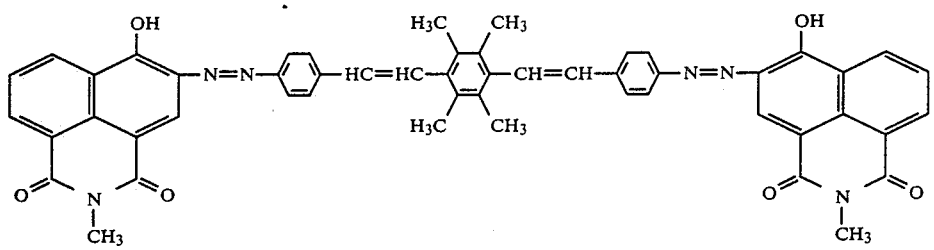
(48)
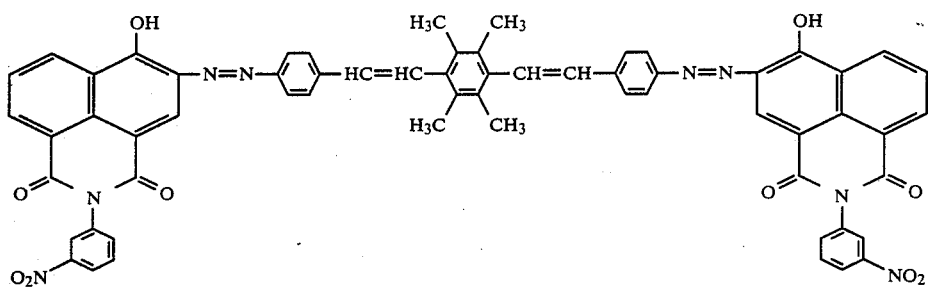
(49)
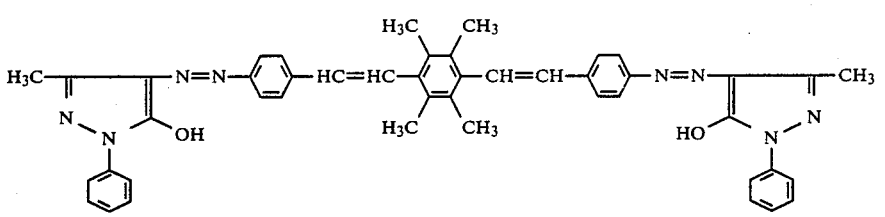
(50)

-continued
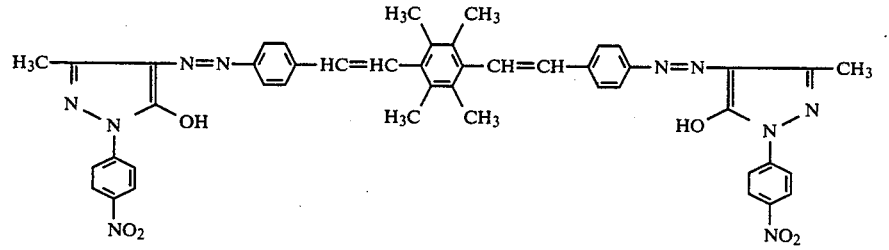
(51)
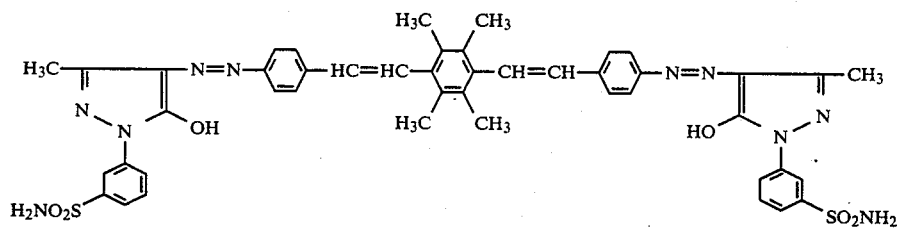
(52)
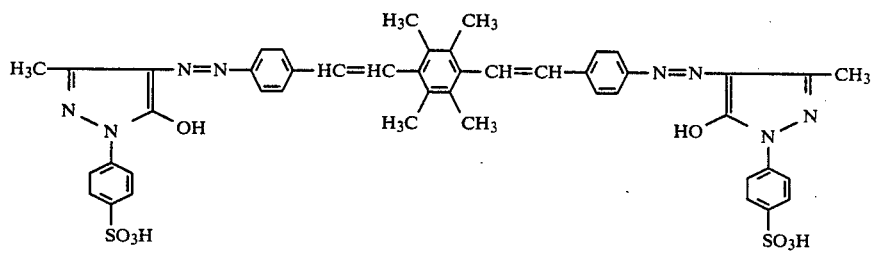
(53)
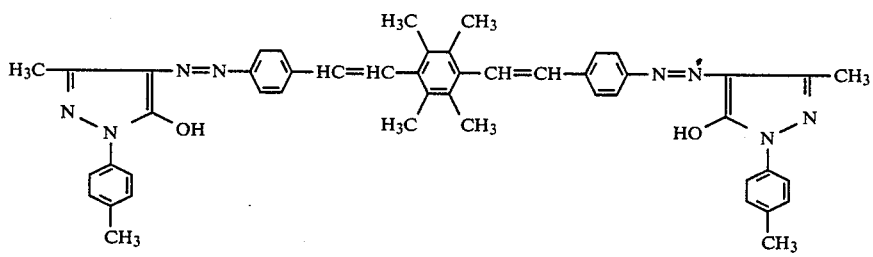
(54)
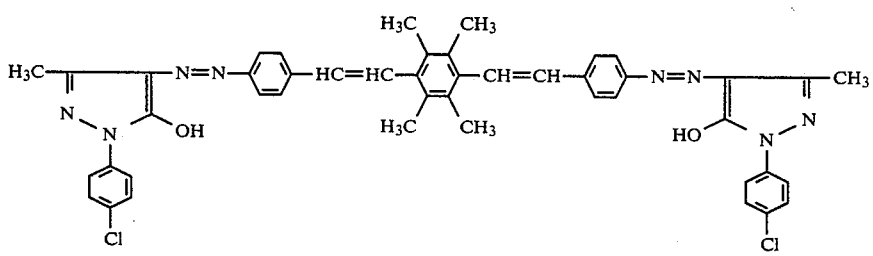
(55)
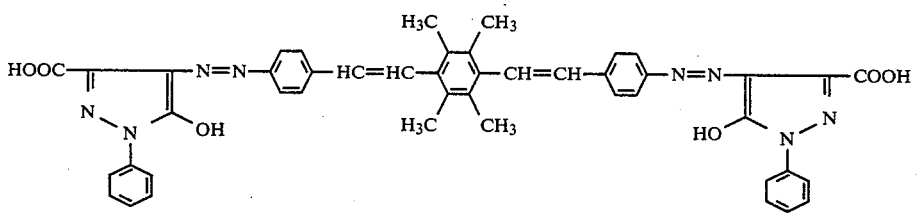
(56)
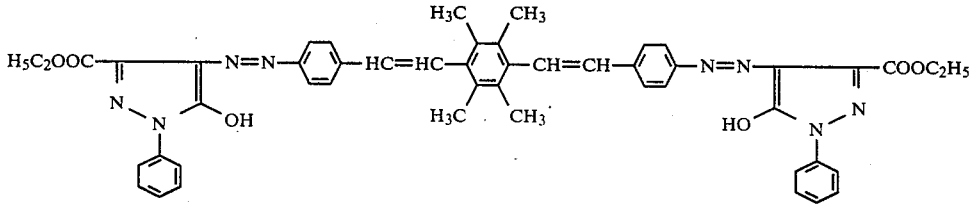
(57)

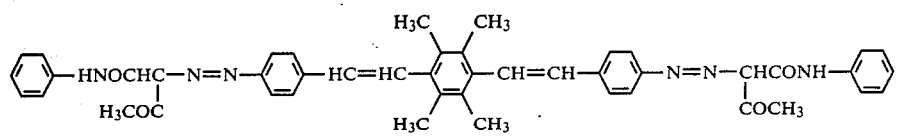
(58)

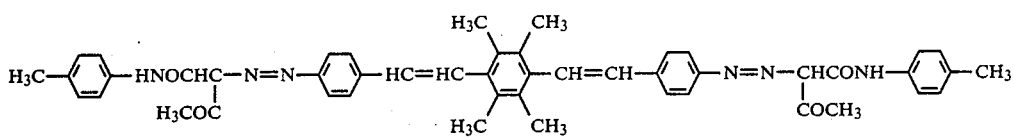
(59)

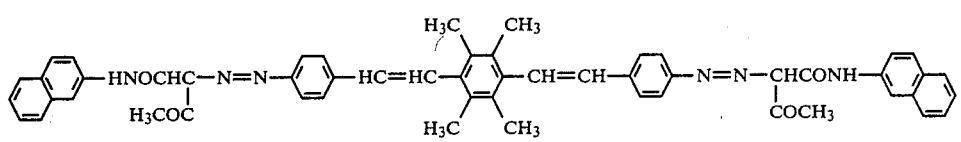
(60)

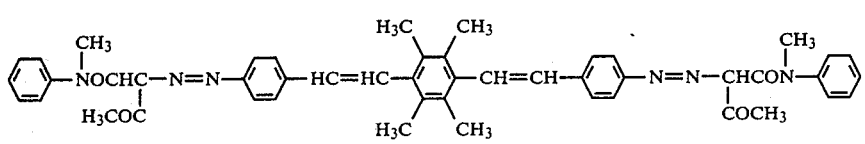
(61)

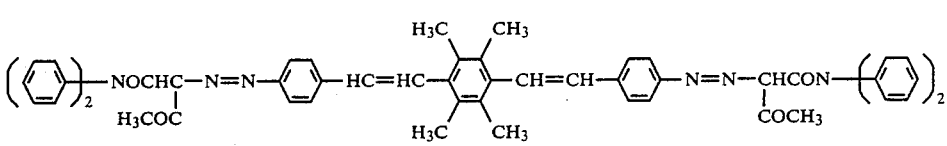
(62)

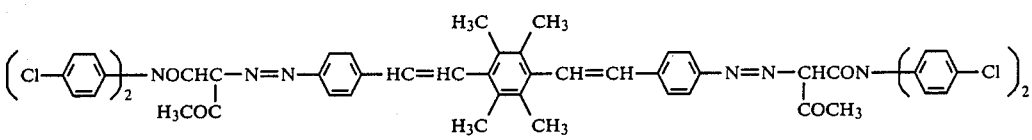
(63)

Of the above compounds, compounds (11), (30) and (31) in addition to compounds shown in the following Examples are more preferable.

The novel disazo compounds of the present invention can be produced by a known process. Namely, they can be easily produced by a process which comprises diazotizing 1,4-bis-(4-aminostyryl)-2,3,5,6-tetramethylbenzene to isolate as a tetrazonium salt and thereafter carrying out a coupling reaction with a compound corresponding to the above described each pigment (for example, a naphthol AS type coupler) in a suitable organic solvent such as N,N-dimethylformamide in a presence of an alkali.

The disazo compounds of the present invention can be used as disazo pigments.

For example, the above described disazo compound (1) can be produced according to Synthesis Example 1.

SYNTHESIS EXAMPLE 1

3.68 g of 1,4-bis-(4-aminostyryl)-2,3,5,6-tetramethylbenzene was added to diluted hydrochloric acid prepared from 10 ml of concentrated hydrochloric acid and 10 ml of water, and the mixture was well stirred on a water bath at 60° C. for about 30 minutes. The resulting mixture was then cooled to 0° C., and a solution prepared by dissolving 1.45 g of sodium nitrite in 10 ml of water was added dropwise thereto at 0° C. over about 30 minutes. Thereafter, the mixture was stirred at the same temperature for 1 hour, and the formed tetrazonium chloride was filtered out. The tetrazonium salt was dissolved in water, and the resulting solution was mixed with the filtrate. To the mixed solution, 7 ml of 42% borofluoric acid was added, and the separated crystals were filtered out. After the crystals were washed with a small amount of cold water, they were dried to obtain 4.81 g (yield: 85%) of crystals of tetrazonium fluoroborate.

5.66 g of the resulting tetrazonium salt and 5.26 g of 2-hydroxy-3-naphthoic acid anilide as a coupler were then dissolved in 150 ml of N,N-dimethylformamide. After a solution composed of 2 g of sodium acetate and 10 ml of water was added dropwise at a temperature of 0° C. over about 20 minutes to the resulting solution, the mixture was stirred at a room temperature for about 2 hours. Thereafter, the formed precipitates were filtered out and washed with 1 liter of water. Then, they were washed with stirring in 500 ml of N,N-dimethylformamide. Thereafter, they were washed with ethanol and dried to obtain 7.96 g (yield: 87%) of a disazo pigment: Compound (1). Decomposition point: above 300° C.

Elementary analysis: As $C_{60}H_{48}O_4N_6$ Calculation value: C: 78.58%; H: 5.28%; N: 9.16% Found value: C: 78.70%; H: 5.11%; N: 9.19%.

IR absorption spectrum: (KBr tablet) Amide 1675 $cm^{-1}$.

Visible ray absorption spectrum: Absorption maximum wavelength: 539 nm in dichloromethane solution.

SYNTHESIS EXAMPLES 2 TO 8

Disazo compound (2), (4), (5), (13), (15), (26) and (45) were synthesized by the same process as in Synthesis Example 1, except that compounds described in Table 1 were used as couplers. The decomposition point, elementary analysis values, IR absorption spectrum and visible ray absorption spectrum of each disazo compound are shown in Table 1.

TABLE 1

| Synthesis Example | Coupler | Disazo Compound (Decomposition Point) | Elementary Analysis Value | Calculation Value (%) | Found Value (%) | IR Absorption Spectrum $\nu_c = 0\ cm^{-1}$ (KBr Method) | $\lambda_{max}$: nm (in Dichloroethane) |
|---|---|---|---|---|---|---|---|
| 2 | HO—naphthalene—CONH—C₆H₄(o-CH₃) | (2) (285–286° C.) | C H N | 78.79 5.55 8.89 | 78.40 5.32 8.87 | 1675 | 546 |
| 3 | HO—naphthalene—CONH—C₆H₄(p-Cl) | (4) (286–288° C.) | C H N Cl | 73.09 4.70 8.52 7.19 | 72.91 5.03 8.74 7.18 | 1675 | 548 |
| 4 | HO—naphthalene—CONH—C₆H₄(m-NO₂) | (5) (More than 300° C.) | C H N | 67.28 4.33 10.46 | 67.03 4.06 10.64 | 1680 | 530 |
| 5 | HO—naphthalene—CONH—C₆H₃(CH₃)(CH₃) | (13) (268–269° C.) | C H N | 78.99 5.80 8.64 | 78.79 5.89 8.46 | 1675 | 537 |
| 6 | HO—naphthalene—CONH—C₆H₄(o-OCH₃) | (15) (292.5–294° C.) | C H N | 76.21 5.36 8.60 | 76.57 5.43 8.84 | 1670 | 542 |

TABLE 1-continued

| Synthesis Example | Coupler | Disazo Compound (Decomposition Point) | Elementary Analysis Value | | | IR Absorption Spectrum $\nu_c = 0$ cm$^{-1}$ (KBr Method) | $\lambda_{max}$: nm (in Dichloroethane) |
|---|---|---|---|---|---|---|---|
| | | | | Calculation Value (%) | Found Value (%) | | |
| 7 | HO—[naphthalene]—CONH—[naphthalene] | (26) (216–225° C.) | C<br>H<br>N | 73.95<br>6.27<br>8.16 | 74.10<br>6.55<br>8.17 | 1670 | 550 |
| 8 | [naphthalimide structure with OH and N-C₂H₅] | (45) (More than 300° C.) | C<br>H<br>N | 74.30<br>5.08<br>9.63 | 74.07<br>4.92<br>9.94 | 1695 | 535<br>564 |

An infrared absorption spectrum (KBr method) of the disazo compound (1) is shown in the FIGURE.

Other disazo compounds can be synthesized according to the above described Synthesis Example by changing the coupler.

The electrophotographic light-sensitive materials of the present invention have an electrophotographic light-sensitive layer containing one or more disazo compounds represented by the above described general formula. Various types of electrophotographic light-sensitive material have been known, and the electrophotographic light-sensitive materials of the present invention can be applied to any type of light-sensitive material. However, they have generally the following types of electrophotographic light-sensitive construction.

(1) An electrophotographic light-sensitive layer in which diazo compounds are dispersed in a binder or a charge transporting medium is provided on an electrically conductive base.

(2) A charge generating layer containing the disazo compounds as a main component is provided on an electrically conductive base, and a charge transporting medium layer is provided on the above described layer.

The disazo componds of the present invention act as photoconductive substances, which produce charge carriers with very high efficiency when light is absorbed. Although the produced charges can be transported through the disazo compounds as a medium, it is more effective to transport through a charge transporting compound as a medium.

In order to produce electrophotographic light-sensitive materials of the type (1), fine particles of the disazo compounds are dispersed in a solution of a binder or a solution prepared by dissolving a charge transporting compound and a binder, and the resulting dispersion is applied to an electrically conductive base and dried. The electrophotographic light-sensitive layer in this case preferably has a thickness of 3 to 30μ, more preferably 5 to 20μ.

In order to produce electrophotographic light-sensitive materials of the type (2), the disazo compounds are applied to an electrically conductive base by vacuum evaporation or by applying a solution prepared by dissolving the disazo compounds in a suitable solvent such as amine, etc. or by applying a dispersion prepared by dispersing fine particles of the disazo compounds in a suitable solvent or, if necessary, a solvent containing a binder and drying, and, thereafter, a solution containing a charge transporting compound and a binder is applied to the resulting layer and dried. The disazo compound containing layer which is a charge generating layer in this case preferably has a thickness of 4μ or less, more preferably 2μ or less, and the charge transporting layer preferably has a thickness of 3 to 30μ, more preferably 5 to 20μ.

The disazo compounds used for the light-sensitive materials of the types (1) and (2) are prepared by grinding by means of a dispersing machine such as a ball mill, a sand mill or a vibration mill so as to have a particle size of 5μ or less, preferably 2μ or less.

If the amount of the disazo compounds used in the electrophotographic light-sensitive materials of the type (1) is too small, the sensitivity is inferior, and, if it is too large, the electrically charging property deteriorates or the strength of the electrophotographic light-sensitive layer becomes weak. Accordingly, the weight amount of the disazo compounds in the electrophotographic light-sensitive layer is preferably in a range of 0.01 to 5 times, more preferably 0.05 to 3 times the weight of the binder. The weight amount of the charge transporting compound which is added as occasion demands is preferably in a range of 0.1 to 2 times, more preferably 0.3 to 1.3 times the weight of the binder. Further, when using the charge transporting compound which can be used as a binder, the disazo compounds are preferably used in a weight amount of 0.01 to 0.5 time the weight of the binder.

Further, in the electrophotographic light-sensitive materials of the type (2), when a disazo compound containing layer which is a charge generating layer is formed by coating, it is preferred that the weight amount of the disazo compounds is 0.1 or more times the weight of the binder resin. If the amount is less than 0.1 times by weight, sufficient sensitivity can not be obtained. The weight amount of the charge transporting compound in the charge transporting medium is preferred to be in a range of 0.2 to 2 times, preferably 0.3 to 1.3 times the weight of the binder. When using a high molecular charge transporting compound which can be used itself as a binder, it is possible to use it without using another binder.

When producing the electrophotographic light-sensitive materials of the present invention, additives such as a plasticizer or a sensitizer, etc. may be used together with the binder.

The electrically conductive base used in the electrophotographic light-sensitive materials of the present invention may be metal plates such as aluminum, copper or zinc plates, etc., plastic sheets such as polyester sheets, etc., plastic films to which an electrically conductive material such as aluminum, indium oxide or $SnO_2$, etc. is applied by vacuum evaporation or by applying a dispersion thereof, and papers which are treated so as to have an electrically conductive property.

Useful binders include condensation type resins such as polyamide, polyurethane, polyester, epoxy resin, polyketone or polycarbonate, etc., and vinyl polymers such as polyvinylketone, polystyrene, poly-N-vinylcarbazole, or polyacrylamide, etc., but any resin which is electrically insulating and has an adhesive property can be used.

Useful plasticizers include biphenyl, chlorinated biphenyl, o-terphenyl, p-terphenyl, dibutyl phthalate, dimethyl glycol phthalate, dioctyl phthalate, triphenyl phosphate, methylnaphthalene, benzophenone, chlorinated paraffin, polypropylene, polystyrene, dilaurylthio-dipropionate, 3,5-dinitrosalicylic acid and various fluorohydrocarbons, etc.

In addition, silicone oil, etc. may be added in order to improve the surface properties of the electrophotographic light-sensitive materials.

Useful sensitizers include chloranil, tetracyanoethylene, Methyl Violet, Rhodamine B, cyanine dyes, merocyanine dyes, pyrylium dyes and thiapyrlylium dyes.

Compounds which transport charges are classified generally into two kinds, one of which is a compound which transports electrons and the other of which is a compound which transports positive holes. In the electrophotographic light-sensitive materials of the present invention, both of them can be used. Useful compounds which transport electrons include compounds having electron attractive groups, examples of which include, 2,4,7-trinitro-9-fluorenone, 2,4,5,7-tetranitro-9-fluorenone, 9dicyanomethylene-2,4,7-trinitrofluorenone, 9-dicyanomethylene-2,4,5,7-tetranitrofluorenone, tetranitrocarbazole chloranil, 2,3-dichloro-5,6-dicyanobenzoquinone, 2,4,7-trinitro-9,10-phenanthrenequinone, tetrachlorophthalic acid anhydride, tetracyanoethylene and tetracyanoquinodimethane, etc.

Useful compounds which transfers positive holes include compounds having electron donative groups. Examples of high polymers include:

(1) Polyvinylcarbazole and derivatives thereof described in Japanese Patent Publication No. 10966/59;

(2) Vinyl polymers described in Japanese Patent Publication Nos. 18674/68 (U.S. Pat. No. 3,232,755) and 19192/68, (U.S. Pat. No. 3,162,532) such as polyvinylpyrene, polyvinylanthracene, poly-2-vinyl-4,(4'-dimethylaminophenyl)-5-phenyl-oxazole or poly-3-vinyl-N-ethylcarbazole, etc.;

(3) Polymers described in Japanese Patent Publication No. 19193/68, (U.S. Pat. No. 3,169,060) such as polyacenaphthylene, polyindene or acenaphthylene-styrene copolymer, etc.;

(4) Condensation resins as described in Japanese Patent Publication No. 13940/81, (U.S. Pat. Nos. 3,842,038 and 3,881,922) such as pyrene-formaldehyde resin, bromopyrene-formaldehyde resin or ethylcarbazole-formaldehyde resin, etc.; and (5) Triphenylmethane polymers described in Japanese Patent application (OPI) Nos. 90833/81 and 161550/81.

Further, examples of low molecular compounds include:

(6) Triazole derivatives described in U.S. Pat. No. 3,112,197, etc.;

(7) Oxadiazole derivatives described in U.S. Pat. No. 3,189,447, etc.;

(8) Imidazole derivatives described in Japanese Patent Publication No. 16096/62, etc.;

(9) Polyarylalkane derivatives described in U.S. Pat. Nos. 3,615,402, 3,820,989 and 3,542,544, Japanese Patent Publication Nos. 555/70 (U.S. Pat. No. 3,542,547) and 10983/76, (U.S. Pat. No. 3,963,779) Japanese Patent Application (OPI) No. 93224/76, (U.S. Pat. No. 4,127,412) Japanese Patent Application Nos. 88272/78, (Japanese Patent Application (OPI) No. 17105/80) and 78968/79, and Japanese Patent Application (OPI) No. 4148/81) and Japanese Patent Application (OPI) Nos. 108667/80, 156953/80 and 36656/81, etc.;

(10) Pyrazoline derivatives and pyrazolone derivatives described in U.S. Pat. No. 3,180,729, Japanese Patent Application No. 75854/78, (U.S. Pat. No. 4,278,746) and Japanese Patent Application (OPI) Nos. 88064/80, 88065/80, 105537/74, (U.S. Pat. No. 3,837,851) 51086/80, 80051/81, 88141/81, 45545/82, 112637/79 and 74546/80, etc.;

(11) Phenylenediamine derivatives described in U.S. Pat. No. 3,615,404, Japanese Patent Publication No. 10105/76, Japanese Patent Application (OPI) Nos. 83435/79, 110836/79 and 119925/79, and Japanese Patent Publication Nos. 3712/71 and 28336/72, etc.;

(12) Arylamine derivatives described in U.S. Pat. No. 3,567,450, Japanese Patent Publication No. 35702/74, German Patent (DAS) No. 1110518, U.S. Pat. Nos. 3,180,703, 3,240,597, 3,658,520, 4,232,103, 4,175,961 and 4,012,376, Japanese Patent Application (OPI) Nos. 144250/80 and 119132/81, Japanese Patent Publication No. 27577/64, and Japanese Patent Application (OPI) No. 22437/81, etc.;

(13) Amino substituted chalcone derivatives described in U.S. Pat. No. 3,526,501;

(14) N,N-Bicarbazyl derivatives described in U.S. Pat. No. 3,542,546; etc.;

(15) Oxazole derivatives described in U.S. Pat. No. 3,257,203, etc.;

(16) Styrylanthracene derivatives described in Japanese Patent Application (OPI) No. 46234/81, etc.;

(17) Fluorenone derivatives described in Japanese Patent Application (OPI) No. 110837/79, (U.S. Pat. No. 4,245,021) etc.; and

(18) Hydrazone derivatives described in U.S. Pat. No. 3,717,462, Japanese Patent Application (OPI) Nos. 59143/79 (corresponding to U.S. Pat. No. 4,150,987), 52063/80, 52064/80, 46760/80 and 85495/80, Japanese Patent Application Nos. 85495/80 and 33832/81, and Japanese Patent Application (OPI) No. 64244/82, etc.

In the present invention, the compounds which transport charges are not limited to the above described compounds (1) to (18), and all of the known charge transporting compounds can be used.

It is possible to use, if desired, two or more charge transporting materials together.

Further, in the light-sensitive materials obtained as described above, it is possible to provide, if necessary, an adhesive layer or a barrier layer between the electrically conductive base and the light-sensitive layer. Materials used for these layers include polyamide, nitrocellulose and aluminum oxide, etc. These layers are preferred to have a thickness of 1μ or less.

The electrophotographic light-sensitive materials of the present invention have been described in detail in the above, which are generally characterized by high sensitivity and excellent durability.

The electrophotographic light-sensitive materials of the present invention can be applied not only to electrophotographic copying machines but also in the field of light-sensitive materials for printers in which laser or Braun tubes are used as a light source.

The photoconductive compositions containing the disazo compounds of the present invention can be used as a photoconductive layer in video camera tubes and as a photoconductive layer in the known solid camera elements which have a light receiving layer (photoconductive layer) provided on the whole face of a semiconductor circuit arranged one- or two-dimensionally so as to carry out signal transfer or scanning. Further, they can be used as a photoconductive layer in solar cells, as described in A. K. Ghosh, Tom Feng, J. App. Phys. 49 (12) 5982 (1978).

Further, as described in Japanese Patent Publication No. 17162/62, Japanese Patent Application (OPI) Nos. 19063/80 and 161250/80 and Japanese Patent Application No. 33579/81, after the disazo compounds of the present invention are dispersed in a solution of alkali soluble resin such as phenol resin, etc. together with the above described charge transporting compound such as oxadizole derivatives or hydrazone derivatives, etc., and applied to an electrically conductive base such as aluminium, etc. and dried, the resulting material is subjected to imagewise exposing to light, toner development and etching with an aqueous alkaline solution, by which not only printing plates having a high resolving power, a high durability and a high sensitivity are obtained, but also print circuits can be produced.

In the following, the present invention is illustrated in greater detail with reference to examples, but the present invention is not limited to them. In the examples, the term "part" means "part by weight".

EXAMPLE 1

1 Part of disazo compound (1), 5 parts of 4,4′-bis(diethylamino)-2,2′-dimethyltriphenylmethane and 5 parts of polycarbonate of bisphenol A were added to 95 parts of dichloromethane. The mixture was ground and blended by means of a ball mill. The resulting coating solution was applied to an electrically conductive transparent base (wherein an indium oxide membrane is provided by vacuum evaporation on a surface of a polyethylene terephthalate film having 100 μm; surface resistivity: $10^3 \Omega$) by means of a wire wound rod and dried to prepare an electrophotographic light-sensitive material having a monolayer type electrophotographic light-sensitive layer having a thickness of about 9 μm.

This electrophotographic light-sensitive material was electrified in +450 V by corona discharging at +5 KV by means of a testing apparatus for electrostatic copying paper (Type SP-428, produced by Kawaguchi Denki Co.) and, thereafter, it was exposed to light by a tungsten lamp having a color temperature of 3000° K. so as to have a surface illuminance of 4 luxes. When the half-decay exposure amount $E_{50}$ (lux. sec.) was determined by measuring the time necessary to reduce the surface electric potential to half of the initial surface electric potential, it was 1.60 (lux. sec.). After two steps of electrifying and exposing to light were repeated 3000 times, the value $E_{50}$ hardly changed.

EXAMPLES 2 TO 10

Electrophotographic light-sensitive materials having a monolayer construction were produced by the same manner as in Example 1, except that disazo compounds (2), (4), (5), (13), (15), (26), (45), (50) and (58) were used instead of the disazo compound (1). When the half-decay exposure amount was measured by positively electrifying by the same manner as in Example 1, values shown in Table 2 were obtained.

TABLE 2

| Example | Disazo Compound | $E_{50}$ (lux. sec.) |
|---|---|---|
| 2 | (2) | 40 |
| 3 | (4) | 22 |
| 4 | (5) | 11 |
| 5 | (13) | 80 |
| 6 | (15) | 70 |
| 7 | (26) | 31 |
| 8 | (45) | 12 |
| 9 | (50) | 39 |
| 10 | (58) | 47 |

EXAMPLE 11

5 g of the disazo compound (1) was dispersed in a solution prepared by dissolving 2 g of polyvinyl butyral resin (degree of butyral: 63% by mol) in 100 ml of ethanol by processing in a ball mill for 20 minutes. Thereafter, the dispersion was applied to an electrically conductive base (wherein an aluminium membrane formed by vacuum evaporation was provided on the surface of a polyethylene terephthalate film having 100 μm; surface electric resistivity: $10^3 \Omega$) by means of a wire wound rod and dried to form a charge generating layer having a thickness of 1 μm.

A solution prepared by dissolving 2 parts of p-(diphenylamino)benzaldehyde N′-methyl-N′-phenylhydrazone

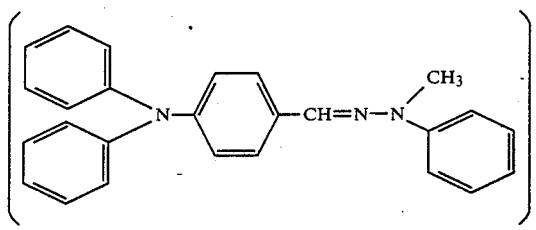

and 4 parts of polycarbonate of bisphenol A in 60 parts of dichloromethane was then applied to the resulting charge generating layer by means of wire wound rod and dried to form a charge transporting layer having a thickness of 17 μm, by which an electrophotographic light-sensitive material having an electrophotographic light-sensitive layer consisting of two layers was produced.

After the light-sensitive material was electrified in −900 V by corona discharging at −5 KV, the half-decay exposure was measured. E$_{50}$ was 2.4 (lux. sec.).

EXAMPLES 12 TO 21

Electrophotographic light-sensitive materials having two layer construction were produced by the same manner as in Example 11, except that disazo compounds (3), (6), (7), (11), (18), (25), (42), (48), (51) and (59) were used instead of the disazo compound (1), respectively, and E$_{50}$ was measured. Results are shown in Table 3.

TABLE 3

| Example | Disazo Compound | E$_{50}$ (lux. sec.) |
| --- | --- | --- |
| 12 | (3) | 2.28 |
| 13 | (6) | 5.4 |
| 14 | (7) | 4.46 |
| 15 | (11) | 6.07 |
| 16 | (18) | 8.8 |
| 17 | (25) | 9.4 |
| 18 | (42) | 15.5 |
| 19 | (48) | 6.95 |
| 20 | (51) | 4.87 |
| 21 | (59) | 7.26 |

EXAMPLE 22

A charge transporting layer having a thickness of 12 μm was formed on a charge generating layer having a thickness of 1 μm by the same manner as in Example 11, except that 4 parts of 2,4,7-trinitro-9-fluorenone were used in the charge transporting layer instead of p-(diphenylamino)benzaldehyde N'-methyl-N'-phenylhydrazone.

The resulting electrophotographic light-sensitive material was charged in +600 V by corona discharging at +5 KV. When E$_{50}$ was measured, it was 13.7 (lux. sec.).

EXAMPLES 23 TO 26

Electrophotographic light-sensitive materials having two layer construction were produced by the same manner as in Example 22, except that disazo compounds (21), (48), (54) and (60) were used instead of the disazo compound (1), respectively, and E$_{50}$ was measured. Results are shown in Table 4.

TABLE 4

| Example | Disazo Compound | E$_{50}$ (lux. sec.) |
| --- | --- | --- |
| 23 | (21) | 28.8 |
| 24 | (48) | 36.9 |
| 25 | (54) | 96.5 |
| 26 | (60) | 43.3 |

EXAMPLE 27

1 part of disazo compound (1) and 1 part of polycarbonate of bisphenol A were added to 25 parts of dichloromethane, and the mixture was ground and blended in a ball mill. The resulting coating solution was applied to an electrically conductive transparent base (wherein an indium oxide membrane formed by vacuum evaporation was provided on the surface of a polyethylene terephthalate film having 100 μm; surface resistivity: $10^3$ Ω) by means of a wire wound rod, and dried to obtain an electrophotographic light-sensitive material having a monolayer type electrophotographic light-sensitive layer having a thickness of about 12 μm.

After the resulting electrophotographic light-sensitive material was charged in +100 V by corona discharging at +5 KV, E$_{50}$ was measured. It was 24.7 (lux. sec.).

EXAMPLES 28 TO 31

Monolayer type electrophotographic light-sensitive materials were produced by the same manner as in Example 27, except that the disazo compounds (20), (41), (55) and (61) were used instead of the disazo compound (1), respectively, and E$_{50}$ was measured. Results are shown in Table 5.

TABLE 5

| Example | Disazo Compound | E$_{50}$ (lux. sec.) |
| --- | --- | --- |
| 28 | (20) | 23.7 |
| 29 | (41) | 34.5 |
| 30 | (55) | 74.3 |
| 31 | (61) | 86.2 |

EXAMPLE 32

1 Part of disazo pigment (1), 1 part of p-(diphenylamino)benzaldehyde N'-methyl-N'-phenylhydrazone used in Example 11 and 6 parts of m-cresol-formaldehyde resin were added to 30 parts of ethylene glycol monoethyl ether, and the mixture was ground and blended in a ball mill. The resulting coating solution was applied to an aluminum plate having a thickness of about 0.25 mm which was dressed by sanding and subjected to anodic oxidation and sealing treatment, by means of a wire wound rod, and dried at 90° C. for 10 minutes and 50° C. for 1 day to produce a sample having a thickness of about 6 μm.

This sample was then subjected to corona discharging in the dark so as to have a surface electric potential of 500 V and it was exposed to a negative image by tungsten light (300 lux. sec.). When reversal development was carried out using Mitsubishi Diafax Master-LOM-ED toner (produced by Mitsubishi Paper Mills, Ltd.), a very sharp positive image could be obtained on the printing original plate. This printing original plate was immersed in a solution prepared by diluting an etching solution DP-1 (aqueous solution of sodium silicate, produced by Fuji Photo Film Co.) 10 times, for 1 minute to remove the light-sensitive layer of the parts where the toner did not adhere (nonimage parts) by dissolution. The results showed that the pigment in the nonimage parts could be easily removed together with the binder to produce a printing plate having a sharp image.

While the invention has been described in detail and with reference to specific embodiments thereof, it will be apparent to one skilled in the art that various changes and modifications can be made therein without departing from the spirit and scope thereof.

What is claimed is:

1. Photoconductive compositions which contain disazo compounds represented by the general formula (I):

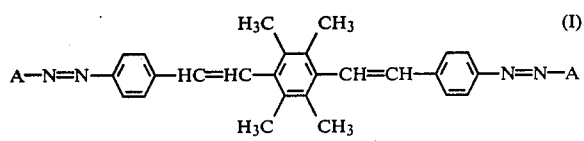 (I)

wherein A represents

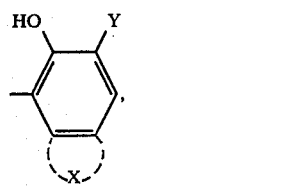

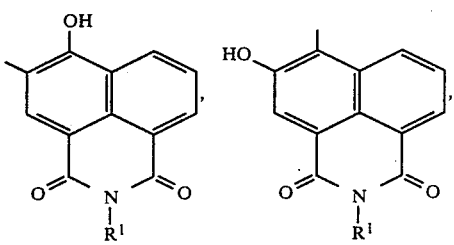

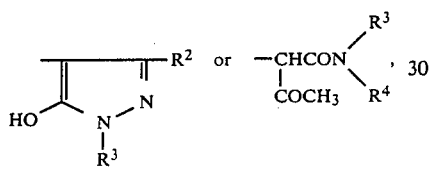

wherein X represents an atomic group necessary to form an aromatic or heterocyclic ring (which may be substituted or nonsubstituted) by condensing with the benzene ring in the above described formula to which a hydroxyl group and Y are attached, Y represents

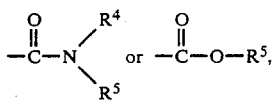

$R^1$ represents an alkyl group, a phenyl group or a substituted alkyl or phenyl group, $R^2$ represents a hydrogen atom, a lower alkyl group, a carbamoyl group, a carboxyl group, an alkoxycarbonyl group, an aryloxycarbonyl group or a substituted or nonsubstituted amino group, $R^3$ and $R^5$ each represents an alkyl group, an aromatic group, a heteroaromatic group or a substituted alkyl, aromatic or heteroaromatic group, and $R^4$ represents a hydrogen atom, an alkyl group, a phenyl group or a substituted alkyl or phenyl group.

2. An electrophotographic light-sensitive material, comprising: a support base having provided thereon; an electrophotographic light-sensitive layer containing disazo compounds represented by the general formula (I):

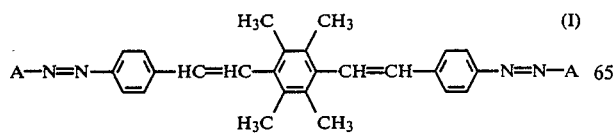 (I)

wherein A represents

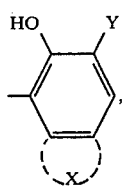

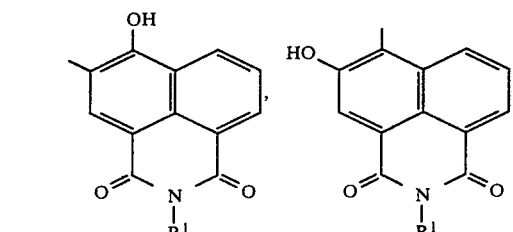

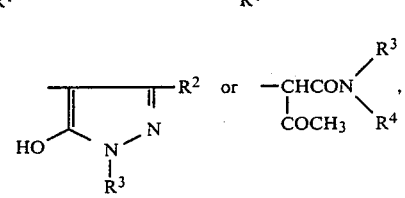

wherein X represents an atomic group necessary to form an aromatic or heterocyclic ring (which may be substituted or nonsubstituted) by condensing with the benzene ring in the above described formula to which a hydroxyl group and Y are attached, Y represents

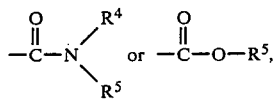

$R^1$ represents an alkyl group, a phenyl group or a substituted alkyl or phenyl group, $R^2$ represents a hydrogen atom, a lower alkyl group, a carbamoyl group, a carboxyl group, an alkoxycarbonyl group, an aryloxycarbonyl group or a substituted or nonsubstituted amino group, $R^3$ and $R^5$ each represents an alkyl group, an aromatic group, a heteroaromatic group or a substituted alkyl, aromatic or heteroaromatic group, and $R^4$ represents a hydrogen atom, an alkyl group, a phenyl group or a substituted alkyl or phenyl group.

3. An electrophotographic light-sensitive material as claimed in claim 2, wherein the light-sensitive layer comprising a binder or a charge transporting medium and disazo compounds represented by the general formula (I) claimed in claim 1 which is dispersed therein.

4. An electrophotographic light-sensitive material as claimed in claim 2, wherein the light-sensitive layer comprising a charge generating layer containing disazo compounds represented by the general formula (I) claimed in claim 1, and a charge transporting layer.

5. An electrophotographic light-sensitive material as claimed in claim 3, wherein the electrophotographic light-sensitive layer has a thickness in the range of 3 to 30μ.

6. An electrophotographic light-sensitive material as claimed in claim 2, wherein the disazo compounds are present in the form of particles having a size of 5μ or less.

7. An electrophotographic light-sensitive material as claimed in claim 3, wherein the electrophotographic light-sensitive layer includes a binder and the disazo compounds are present in the electrophotographic light-sensitive layer in a weight amount of 0.01 to 5 times the weight of the binder.

8. An electrophotographic light-sensitive material as claimed in claim 4, wherein the charge generating layer has a thickness of 4μ or less.

9. An electrophotographic light-sensitive material as claimed in claim 4, wherein the disazo compounds are present in the charge generating layer in a weight amount of 0.1 or more times the weight of the binder.

* * * * *